(12) United States Patent
Nabeshima et al.

(10) Patent No.: US 6,891,639 B1
(45) Date of Patent: May 10, 2005

(54) APPARATUS, METHOD AND SYSTEM FOR IMAGE PROCESSING WITH A COLOR CORRECTION DEVICE

(75) Inventors: Takayuki Nabeshima, Toyokawa (JP); Katsuaki Tajima, Toyokawa (JP); Toshio Tsuboi, Okazaki (JP); Junji Nishigaki, Toyokawa (JP); Daisetsu Tohyama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 959 days.

(21) Appl. No.: 09/648,116

(22) Filed: Aug. 25, 2000

(30) Foreign Application Priority Data

Aug. 27, 1999 (JP) .......................................... 11-241251

(51) Int. Cl.[7] ............................ G06F 15/00; G03F 3/08
(52) U.S. Cl. ........................ 358/1.9; 358/519; 358/518
(58) Field of Search ........................ 358/1.9, 518, 519, 358/520, 521, 522, 537; 382/162, 167

(56) References Cited

U.S. PATENT DOCUMENTS

| | | | | |
|---|---|---|---|---|
| 5,416,890 A | * | 5/1995 | Beretta ........................ 345/590 |
| 5,528,261 A | * | 6/1996 | Holt et al. ................... 345/150 |
| 5,619,349 A | * | 4/1997 | Ueda et al. .................. 358/521 |
| 5,889,929 A | | 3/1999 | Hori et al. ................... 395/109 |
| 5,950,036 A | | 9/1999 | Konishi ......................... 399/8 |
| 6,160,968 A | * | 12/2000 | Noda ............................. 399/8 |
| 6,418,281 B1 | * | 7/2002 | Ohki ........................... 399/49 |
| 6,459,425 B1 | * | 10/2002 | Holub et al. ................. 345/207 |
| 6,686,953 B1 | * | 2/2004 | Holmes ........................ 348/179 |
| 6,804,025 B1 | * | 10/2004 | Ueda et al. ................... 358/1.9 |

FOREIGN PATENT DOCUMENTS

| | | | | |
|---|---|---|---|---|
| DE | | 4305693 A1 | * 10/1993 | ............. G03F/3/08 |
| JP | | 10-173842 | 6/1998 | |

* cited by examiner

Primary Examiner—Madeleine Nguyen
(74) Attorney, Agent, or Firm—McDermott Will & Emery LLP

(57) ABSTRACT

An apparatus, a method and a system for image processing with a color correction device are provided in which the number of times of automatic execution of calibration is reduced and the performance of an image output apparatus is used adequately. The apparatus includes a color space conversion portion 110 for converting input image data D1 into data D1s of a standard color space and a reproduction range decision portion 111 for deciding whether the input image data D1s that were converted into the standard color space are within a reference range of a color reproduction in an image output. If it is decided that the input image data are out of the reference range, the calibration is performed so that the color reproduction range is made close to the reference range.

17 Claims, 9 Drawing Sheets

PORTION HAVING A NARROW REPRODUCTION RANGE

Fig. 5 105 γ CORRECTION PORTION

APPARATUS, METHOD AND SYSTEM FOR IMAGE PROCESSING WITH A COLOR CORRECTION DEVICE

This application is based on Japanese Patent Application No. 241251/1999 filed on Aug. 27, 1999, the contents of which are incorporated herein by reference.

BACKGROUND OF THE INVENTION

1. Field of the Invention

The present invention relates to an apparatus, a method and a system for image processing with a color correction device for outputting an image by a printer or a display.

2. Description of the Prior Art

In a printer or a copying machine, a calibration function is realized for a diagnosis and a correction of an operating state, so that quality deterioration of an image due to a change of environment or a degradation of components is prevented. In a digital print apparatus, a calibration is performed for adjusting a degree of an image processing such as a density correction. In a color print apparatus, a calibration is performed for diagnose a color reproduction state. In the calibration, a test image is printed and the print result is read by a scanner for comparing the read data with reference data. In this case, a user usually sets the print result to the scanner.

Usually, the calibration is set to be executed automatically every time when a power is turned on. In another example, it is executed when the predetermined number of days has passed since the previous execution (see U.S. Pat. No. 5,889,929). In still another example, the user can select an execution time from a plurality of execution times (see U.S. Pat. No. 5,950,036).

Since the calibration requires a lot of time, it is desirable to execute the calibration only when it is necessary. Especially, when printing a test image, frequent calibrations may increase a burden of the user.

SUMMARY OF THE INVENTION

The object of the present invention is to reduce the number of times of the automatic execution of the calibration and to make full use of the performance of the image output apparatus.

An image processing apparatus according to the present invention comprises a converter for converting the received image data into image data of a standard color space, a decision portion for deciding whether the image data converted by the converter are within the reference range of the color reproduction in the output device, and a controller for controlling the output device to perform a calibration of making the color reproduction range of the output device close to the reference range when the decision portion has decided that the image data are out of the reference range.

An image processing method according to the present invention comprises the steps of receiving the image data, converting the received image data into image data of a standard color space, deciding whether the image data converted in the converting step are within the reference range of the color reproduction in the output device, and controlling the output device to perform a calibration of making the color reproduction range of the output device close to the reference range when the image data have been decided to be out of the reference range in the deciding step.

An image processing system according to the present invention comprises a γ correction portion for performing γ correction of the received image data, an output device for reproducing the image data corrected by the γ correction portion, a converter for converting the received image data into image data of a standard color space, a decision portion for deciding whether the image data converted by the converter are within the reference range of the color reproduction in the output device, and a controller for calibrating the characteristics of the γ correction portion so as to make the color reproduction range of the output device close to the reference range when the decision portion has decided that the image data are out of the reference range, wherein the γ correction portion corrects the image data by the calibrated characteristics, and the output device reproduces the corrected image data.

DESCRIPTION OF THE PREFERRED EMBODIMENTS

Hereinafter, the present invention will be explained more in detail with reference to embodiments and drawings.

Figure 1:
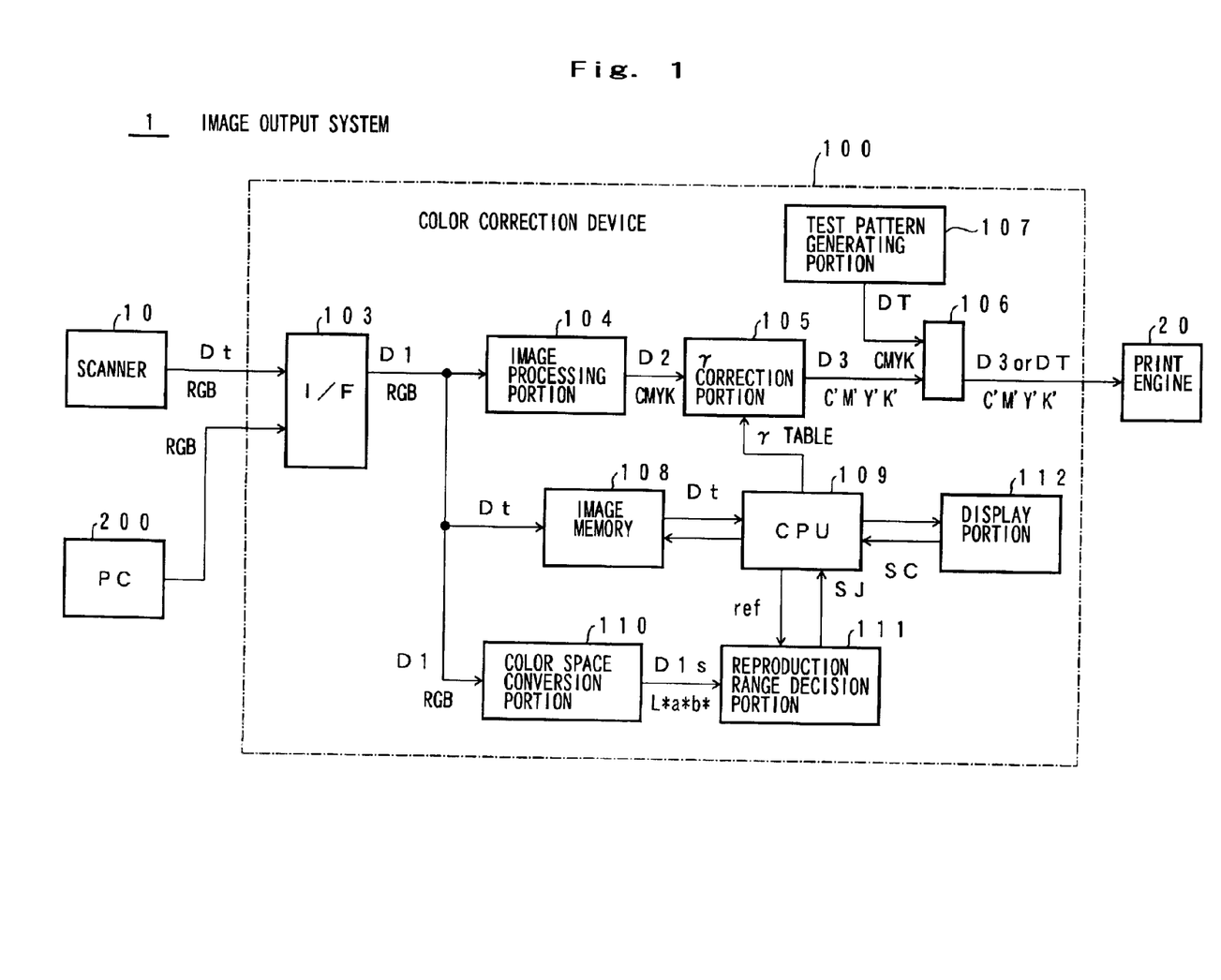
FIG. 1 is a block diagram showing a general configuration of an image output system according to the present invention.

FIG. 1 is a block diagram showing a general configuration of an image output system 1 according to the present invention. The image output system 1 comprises a scanner 10 for reading an original by decomposing it into three colors, i.e., a red, a green and a blue, a print engine 20 for printing a color image, a color correction device 100 that realizes the calibration, and a computer 200 for generating a print job. More specifically, the image output system 1 is a color printer and an image reader, or a computer system having a combination machine thereof. The color correction device 100 built in the color printer or the image reader. Otherwise, as an independent apparatus, it is connected by a cable for use.

In the color correction device 100, an input interface 103 is input switching means that send data from the scanner 10 or the computer 200 as input image data D1 to the rear part. An image processing portion 104 processes the input image data D1 and converts them into CMYK data D2 that are suitable for subtractive color. A γ correction portion 105 is a circuit that sets a γ characteristics for each of the C, M, Y and K colors in accordance with the characteristics of the print engine 20. The γ-corrected CMYK data D3 are sent to the print engine 20 as an object to be printed via a selector 106.

The input image data D1 are also sent to a color space conversion portion 110 from the input interface 103 so as to determine whether the calibration is necessary or not. The color space conversion portion 110 converts the input image data D1 that are RGB data into image data D1s of a standard color space (such as a color space of a CIELAB color system). A reproduction range decision portion 111 decides whether the image data D1s are within a reference range of the color reproduction by the print engine 20 or not, i.e., whether a color that cannot be reproduced is not included. If the image data D1's are data out of the reference range, responding to an input of a signal SJ indicating it, a CPU 109 requests a display portion 112 for a message display that asks whether the calibration is necessary or not. The display portion 112 includes a display with a touch panel, for example, so as to display a predetermined message and operation buttons. The CPU 109 is supplied with a signal SC that indicates operation contents from the display portion 112.

When a user instructs the execution of the calibration, a test pattern generation portion 107 outputs predetermined test image data DT. The selector 106 sends the test image data DT to the print engine 20. The user sets a piece of paper on which a test image is printed on a table of the scanner 10. The read data Dt of the test image are stored in an image memory 108 via the input interface 103. The CPU 109 reads the read data Dt from the image memory 108 and compares them with a target value of the test image, so as to determine a variation quantity of the color reproduction characteristics. Then, the CPU 109 selects a γ correction table in accordance with the determined variation quantity and sets the selected γ correction table in the γ correction portion 105.

By performing this process of the CMYK data D2 in the γ correction portion 105 after the calibration, the color reproduction performance of the print engine 20 can be used adequately. The input interface 103 or the image processing portion 104 may memorize the input image data D1 or the CMYK data D2. Otherwise, the image data may be given again from the computer 200.

Figure 2:
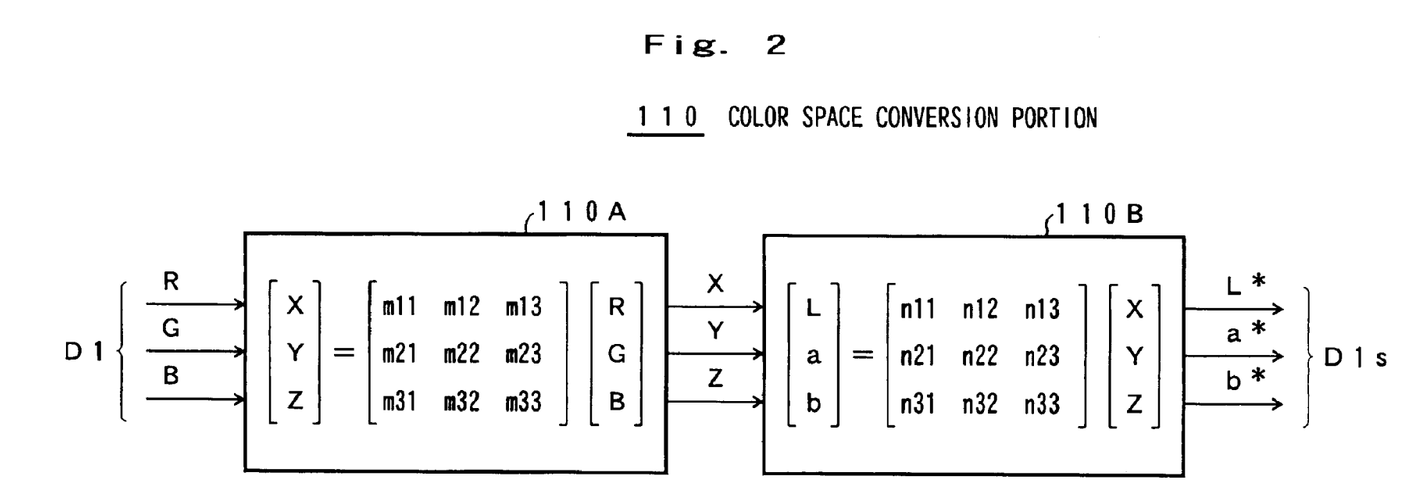
FIG. 2 is a block diagram of a color space conversion portion.

FIG. 2 is a block diagram of the color space conversion portion that is included in the whole configuration shown in FIG. 1.

The input image data D1 are converted into the XYZ color system data by a first operation circuit 110A, and then are converted into L*a*b* color system image data D1s by a second operation circuit 110B. These conversions are performed by a 3×3 matrix operation, for example. Letters $m_{ij}$ and $n_{ij}$ (i, j=1–3) denote conversion coefficients that are unique to the scanner 10. It is also possible to convert the RGB data into the L*a*b* data by one operation.

Figure 3:
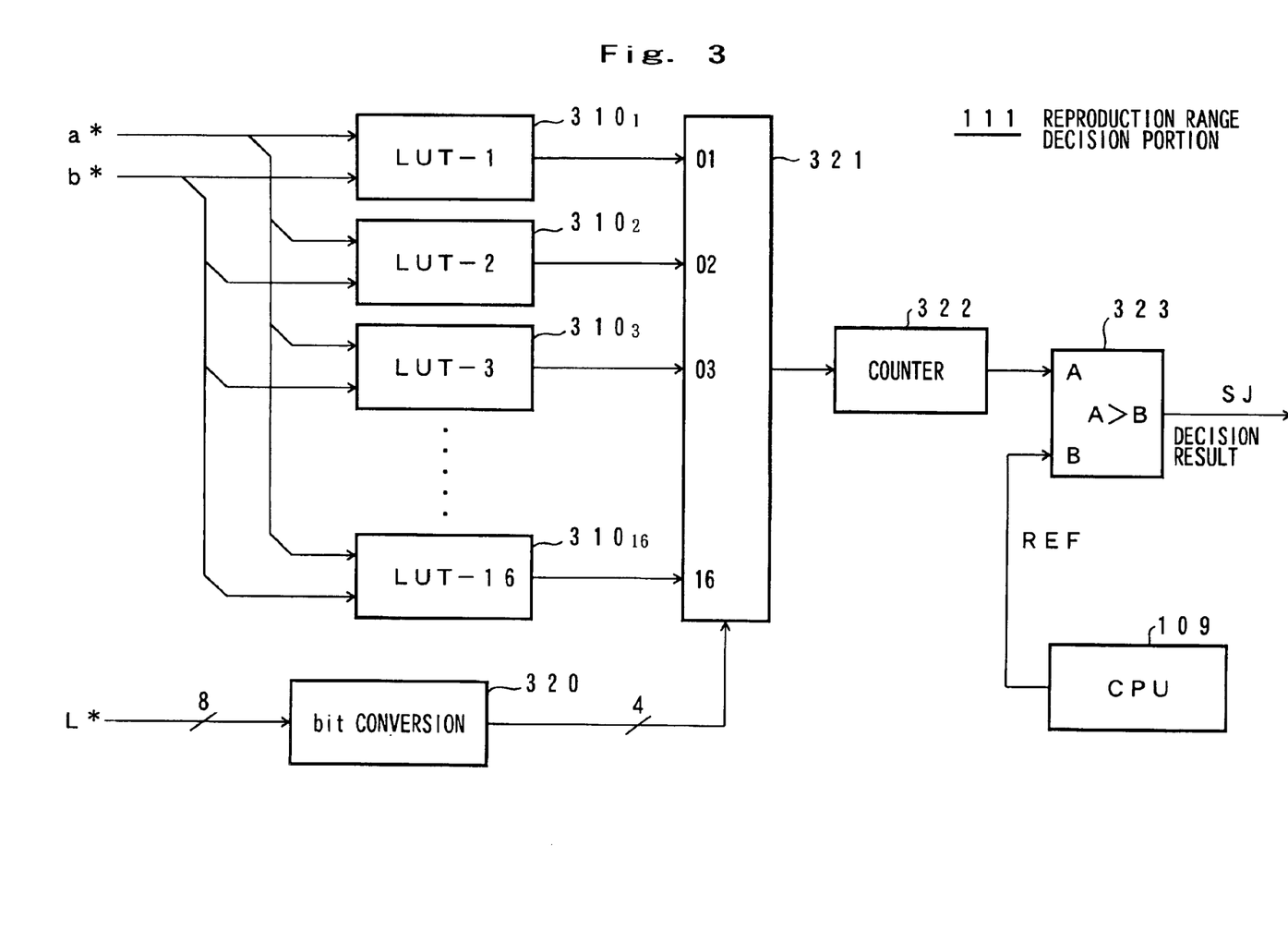
FIG. 3 is a block diagram of a reproduction range decision portion.

FIG. 3 is a block diagram of the reproduction range decision portion.

Chromaticness indexes a* and b* of the image data D1s that are supplied from the color space conversion portion 110 are given to sixteen look-up tables (LUT) $310_1$–$310_{16}$ in parallel. Each of the look-up tables $310_1$–$310_{16}$ outputs a signal for each pixel. The signal indicates a decision of whether the input value that is a combination of the chromaticness indexes a* and b* is within the reference range or not (e.g., "0" means within the reference range, and "1" means out of the reference range). Each of the look-up tables $310_1$–$310_{16}$ stores a table for the decision about a subspace that is generated by dividing the L*a*b* color space into sixteen in the direction of the L* axis. Therefore, the selector 321 selects one output that corresponds to the value of the lightness index L* from the outputs of the sixteen look-up tables $310_1$–$310_{16}$. The selector 321 is supplied with the lightness index L* as a select signal that was converted from eight bits into four bits by a bit conversion portion 320.

A counter 322 counts the number of the pixels whose colors are out of the reference range in accordance with the output of the selector 321. Then, the comparator 323 outputs a signal SJ that indicates that the input image is out of the reference range when the output value of the counter 322 becomes greater than a predetermined value REF. The predetermined value REF is given by the CPU 109.

Figure 4A:
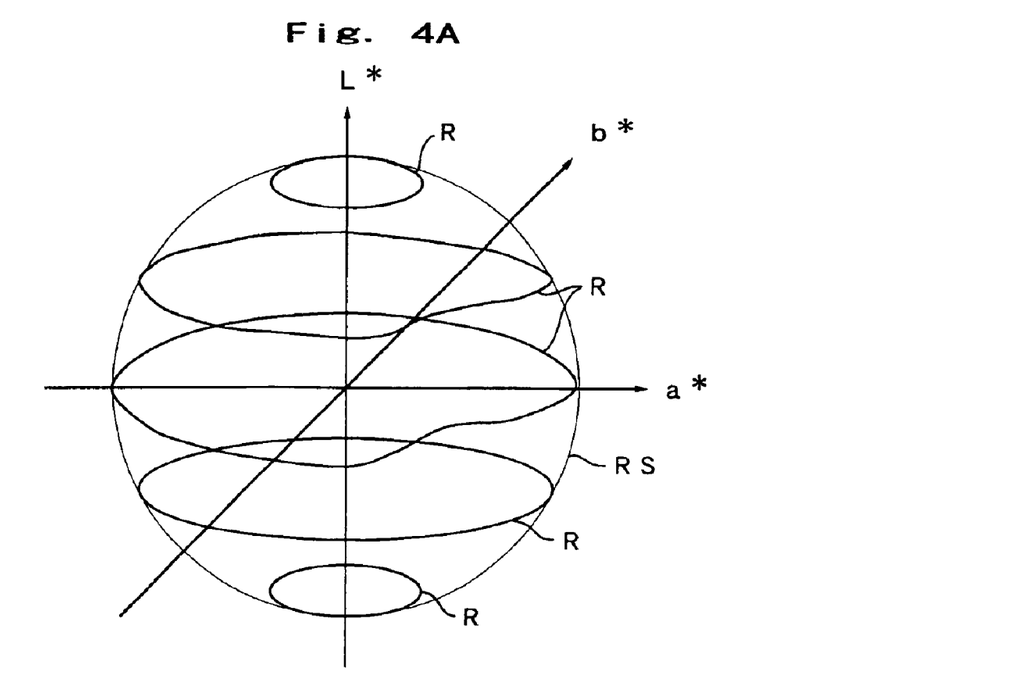
FIGS. 4A and 4B show a concept of a color reproduction range.
Figure 4B:
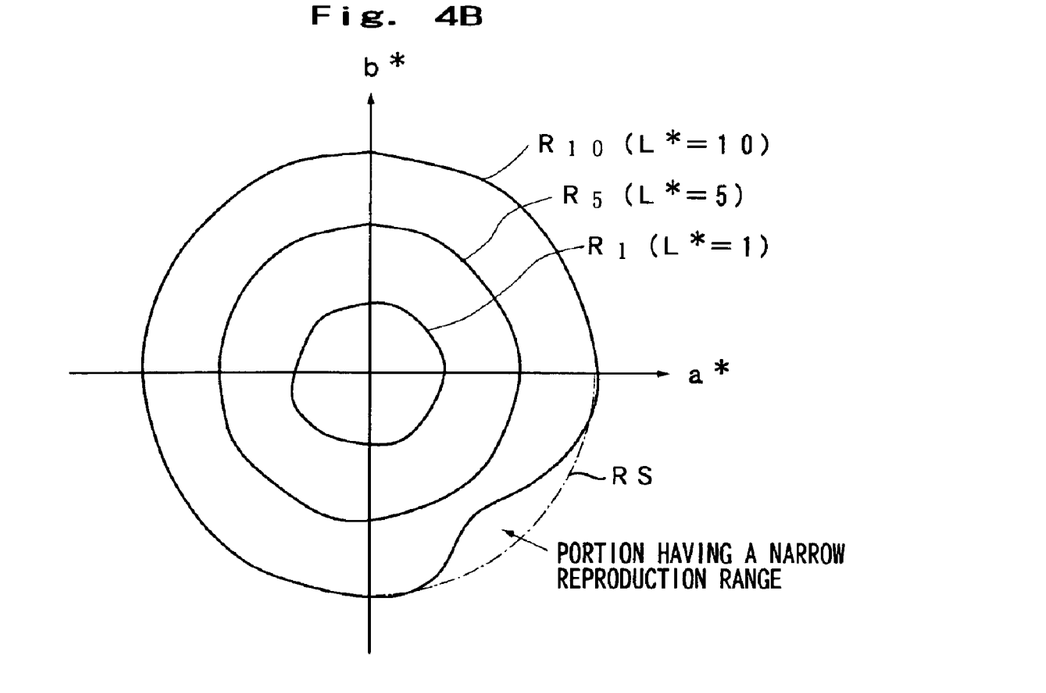

FIGS. 4A and 4B show a concept of the color reproduction range.

FIG. 4A shows a three-dimensional space defined by the L* axis, the a* axis and the b* axis, in which the color reproduction ranges (the reference range and the real range) RS, R are solids having a small circle at the ends in the direction of the L* axis (substantially spheres in FIG. 4A). FIG. 4B shows the color reproduction range in two-dimensional space defined by the a* axis and the b* axis, in which the L*a*b* color space is divided in accordance with plural levels of the lightness index L*. It is supposed that the lightness index L* is divided into sixteen, and the levels 1, 2, ... 16 are set in order from low lightness. Therefore, the color reproduction range in which L*=1 is a small circle. In FIG. 4B, color reproduction ranges in which L*=1, L*=5 and L*=10 are drawn. In this example, the real color reproduction range $R_{10}$ in which L*=10 is substantially narrower than the reference range RS.

Figure 5:
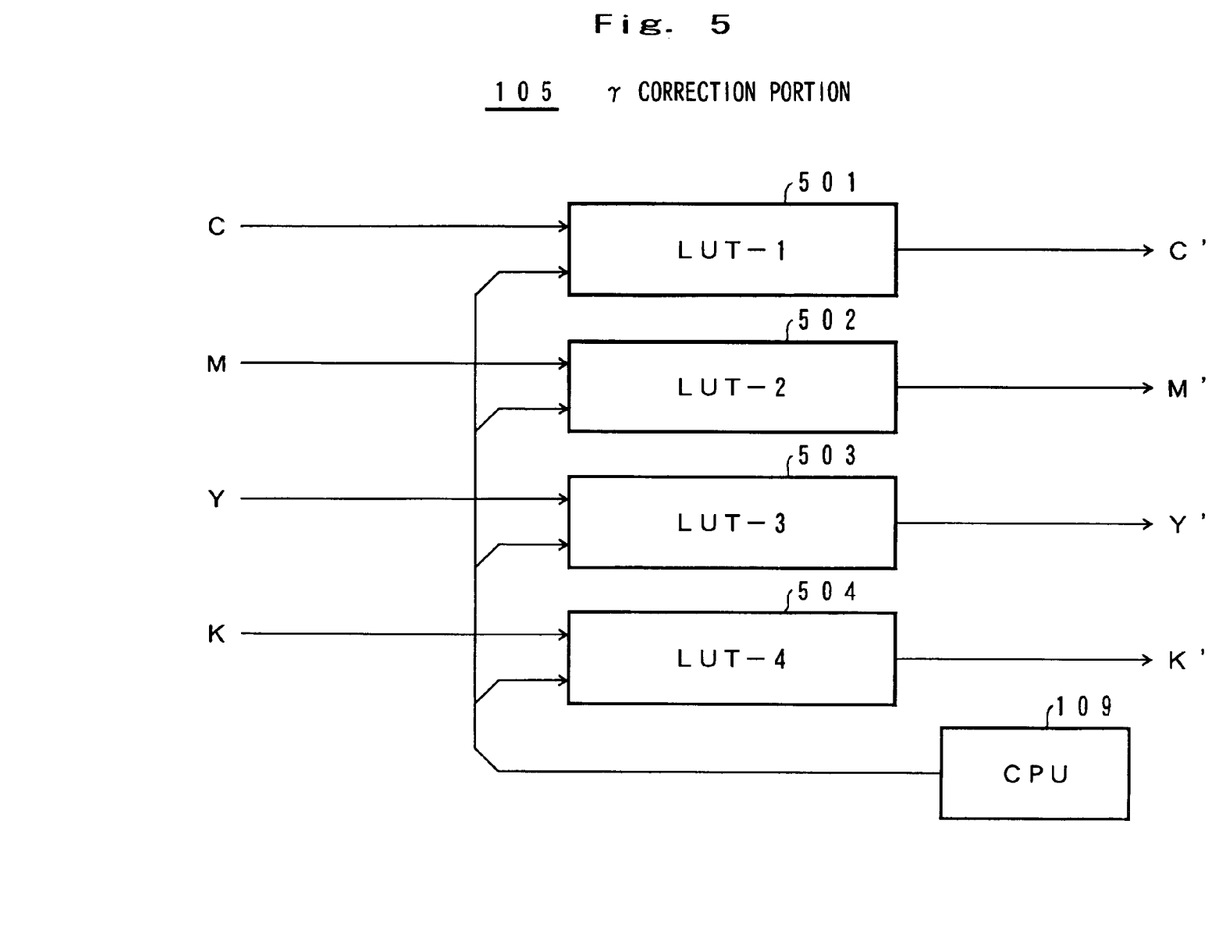
FIG. 5 is a block diagram of a γ correction portion.

FIG. 5 is a block diagram of the γ correction portion.

The γ correction portion 105 comprises four look-up tables 501–504 that correspond to four colors, C, M, Y and K, respectively. Each of the look-up tables 501–504 can be switched in the input and output relations. As explained above, the CPU 109 sets the optimal γ table in accordance with the print state of the test image. The table may be rewritten, or one of plural tables may be selected for use.

Figure 6:
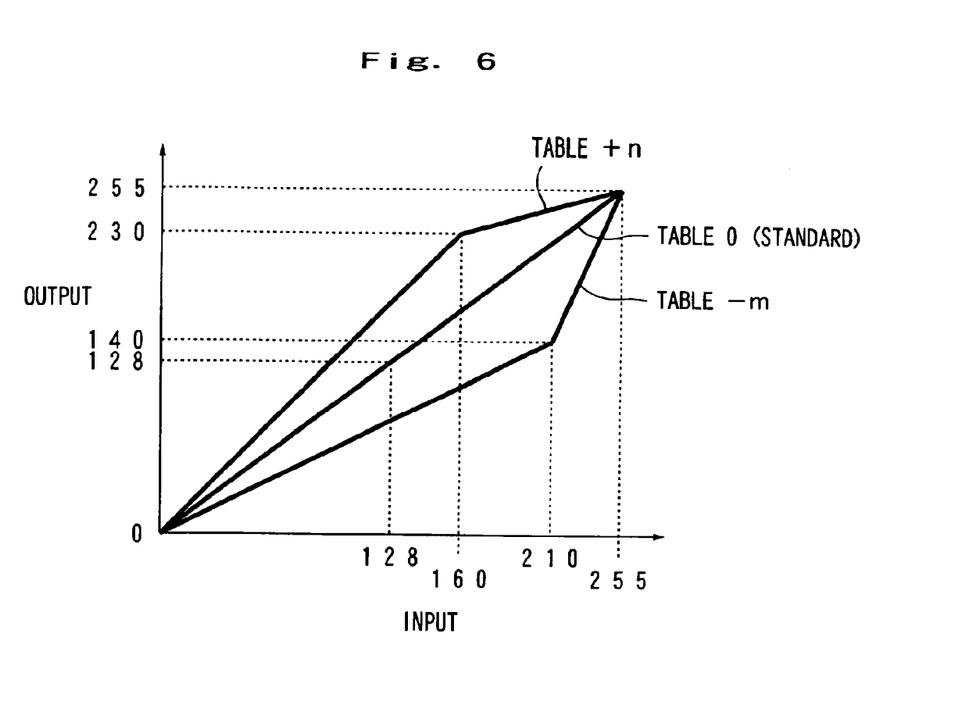
FIG. 6 shows contents of a γ table.

FIG. 6 shows contents of the γ table.

In the calibration, if the read vale of the test image is smaller than the target value, the current table (e.g., the standard table 0) is replaced with the table +n whose γ characteristics are steep. If the read vale of the test image is larger than the target value, the table −m whose γ characteristics are not steep. In this example shown in FIG. 6, there are three kinds of γ characteristics including the standard and the plus side of the standard and the minus side of the standard. However, the optimal one is selected from many tables having different gradients in reality.

Figure 7:
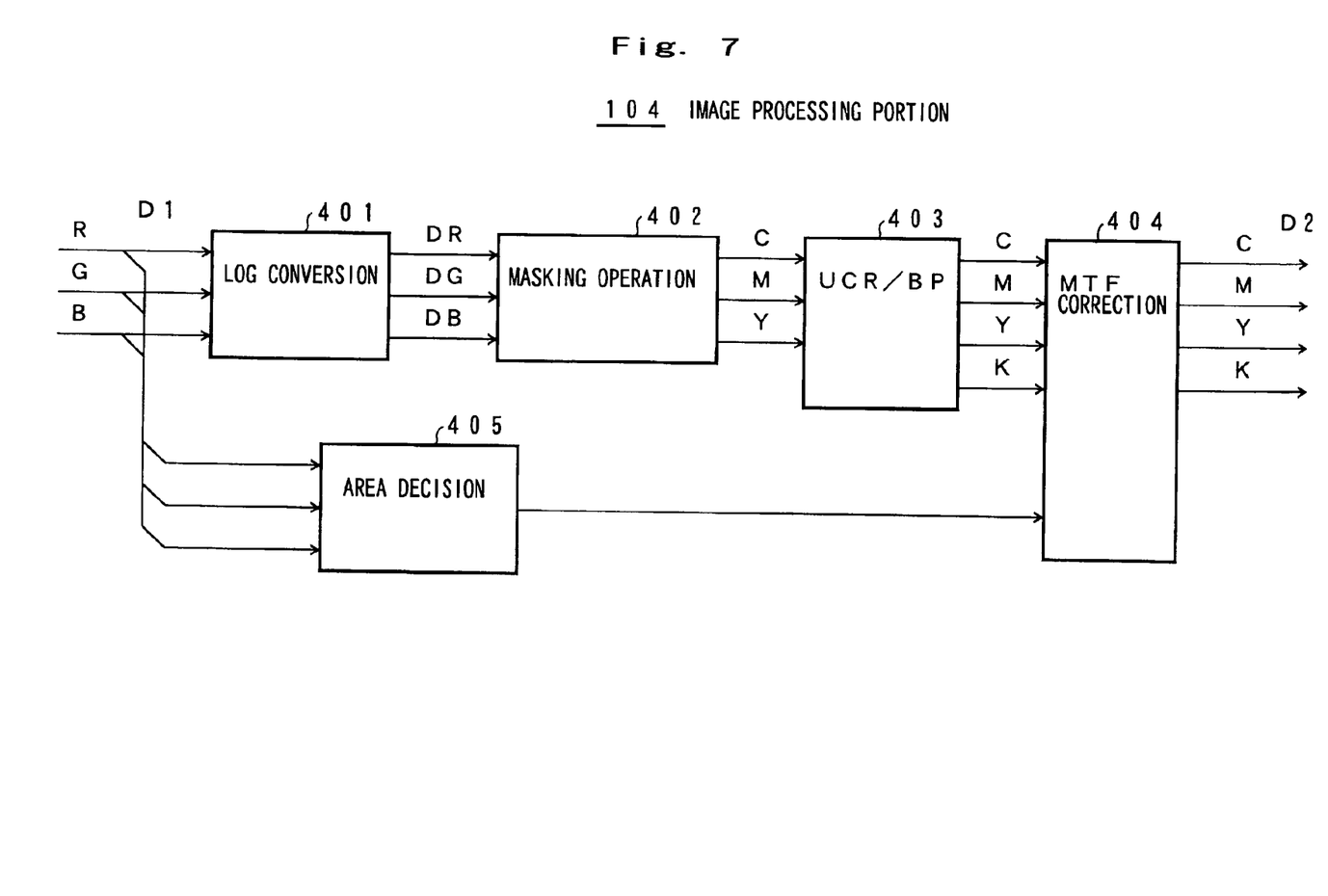
FIG. 7 is a block diagram of an image processing portion.

FIG. 7 is a block diagram of the image processing portion.

The contents of the image processing are not related to the present invention directly, so the general configuration will be explained.

The input image data D1 are converted from intensity data to density data DR, DG and DB for each of the R, G and B colors by the LOG conversion portion 401. In a masking operation portion 402, density data DR, DG and DB are converted into color data of C, M and Y adapted to the scanner characteristics and the print engine characteristics. Then, a UCR/BP portion 403 performs a black print generating process, in which the C, M and Y equivalent portions are replaced with K data.

An area decision portion 405 performs an area decision process such as an edge decision in accordance with input image data D1. An MTF correction portion 404 performs a process such as an edge emphasis of the CMYK data in accordance with the result of the area decision, so as to output CMYK data D2 whose image quality is improved.

Figure 8:
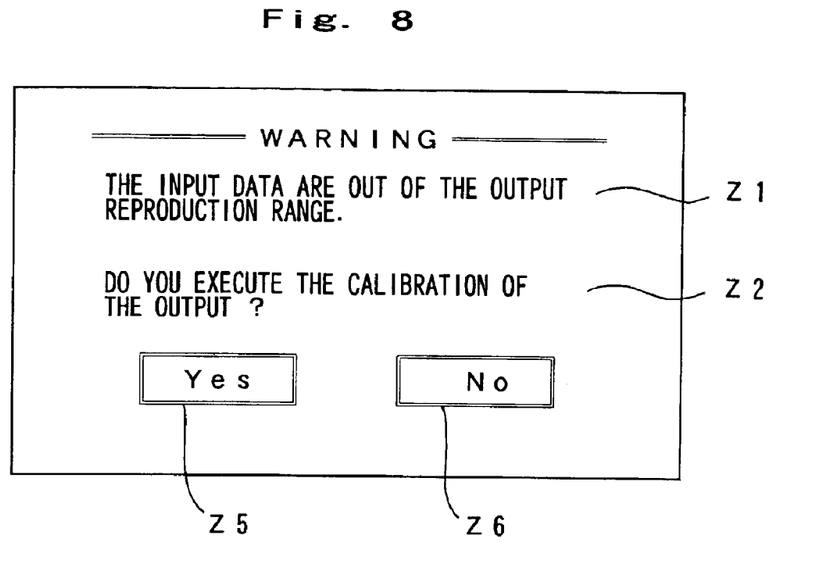
FIG. 8 shows an example of a warning display.

FIG. 8 shows an example of a warning display.

If the input image data D1 are out of the reference range, a message Z1 indicating the fact is displayed. At the same time, a message Z2 asking whether the calibration is necessary is displayed along with two buttons Z5, Z6. When the user pushes the button Z5 (Yes), the calibration starts. When the button Z6 (No) is pushed, the warning display is aborted, and the input image data D1 are printed under the current operation condition.

Figure 9:
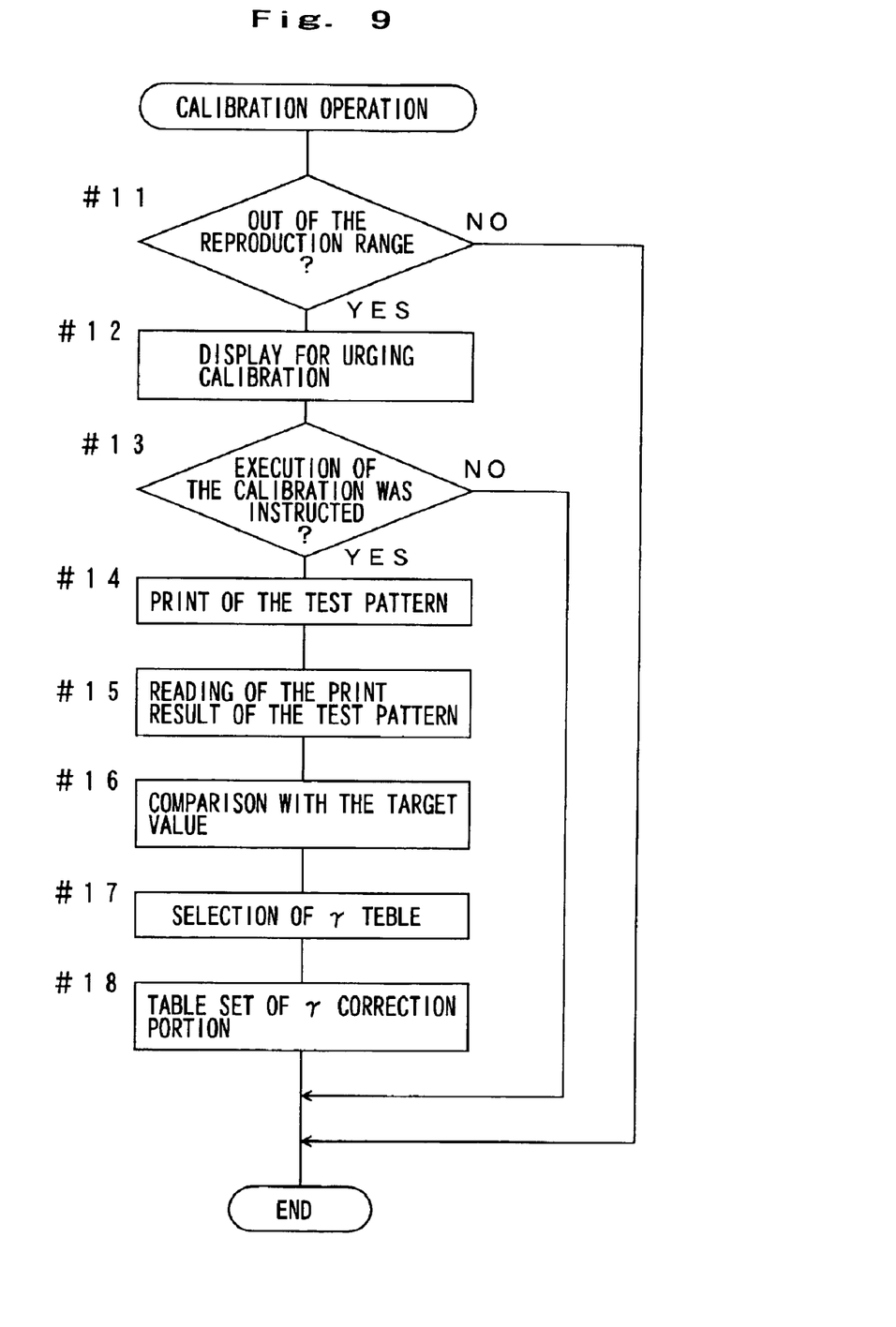
FIG. 9 is a flow chart of the calibration operation of the color correction device.

FIG. 9 is a flow chart of the calibration operation of the color correction device.

If the input image data are out of the reference range of the color reproduction, a display indicating the fact to the user is performed (#11, #12). Then, when the user instructs the execution, the calibration is performed. Namely, the test image is printed, the print result is read by the scanner so as to obtain the read data, and the contents of the γ correction are changed in accordance with the difference between the print result and the target value (#13–#18).

If the input image data are within the reference range of the color reproduction, or when the user instructs non-execution of the calibration even if the input image data are out of the reference range, the calibration is not executed, but the CMYK data D3 are outputted in accordance with the input image data.

According to the above-mentioned example, the calibration is executed not regularly but limitedly when it is regarded to be necessary from the input image. Therefore, the burden of the user, i.e., placing a piece of paper having a printed text pattern on the scanner 10 can be eliminated.

According to the present invention, the number of times of automatic execution of the calibration can be reduced, and the performance of the image output apparatus can be used adequately.

In addition, the user can stop the calibration in accordance with the state so that the output of the image does not delayed.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. An image processing apparatus for supplying received image data to an output device to reproduce the image data, an actual reproduction range of the output device decreasing from a reference range over time of operation of said output device, the apparatus comprising:
  a converter for converting the received image data into image data of a standard color space;
  a decision portion for deciding whether the image data converted by the converter are within the reference range of a color reproduction in the output device; and
  a controller for controlling the output device to perform calibration to increase the color reproduction range of the output device close to the reference range when the decision portion has decided that the image data are out of the reference range, wherein
  the color reproduction range of the output device is compared to the reference range to perform calibration on the output device.

2. The image processing apparatus according to claim 1, further comprising a display for displaying a message asking whether the calibration is necessary or not when the decision portion has decided that the image data are out of the reference range, wherein the controller controls the output device to perform the calibration in accordance with a specific instruction operation responding to the message displayed on the display.

3. The image processing apparatus according to claim 1, wherein the output device performs γ correction of the input image data, the corrected image data are reproduced, and characteristics of the γ correction of the output device are changed in the calibration.

4. The image processing apparatus according to claim 1, wherein in the calibration the output device reproduces a predetermined test pattern and the controller calibrates the color reproduction range of the output device so that the reproduced test pattern becomes a predetermined target value.

5. The image processing apparatus according to claim 1, wherein the output device reproduces the image on a piece of paper.

6. The image processing apparatus according to claim 5, wherein in the calibration the output device reproduces a predetermined test pattern on a piece of paper, and the controller calibrates the color reproduction range of the output device so that the image data obtained when an image reader reads the test pattern become a predetermined target value.

7. An image processing method for reproducing image data by an output device, an actual reproduction range of the output device decreasing from a reference range over time of operation of said output device, the method comprising the steps of:
  receiving the image data;
  converting the received image data into image data of a standard color space;
  deciding whether the image data converted in the converting step are within the reference range of the color reproduction in the output device; and
  controlling the output device to perform calibration to increase the color reproduction range of the output device close to the reference range when the image data have been decided to be out of the reference range in the deciding step, wherein
  performing calibration includes comparing the color reproduction range of the output device to the reference range.

8. The image processing method according to claim 7, further comprising the step of displaying a message asking whether the calibration is necessary or not when it is decided that the image data is out of the reference range in the deciding step, wherein the controlling step includes the step of controlling the output device to perform the calibration in accordance with a specific instruction operation responding to the message displayed on the display.

9. The image processing method according to claim 7, wherein the output device performs γ correction of the input image data, reproduces the corrected image data, and characteristics of the γ correction of the output device are changed in the calibration.

10. The image processing method according to claim 7, wherein the controlling step includes the steps of:
  reproducing a predetermined test pattern in the output device; and
  calibrating the color reproduction range of the output device so that the test pattern reproduced in the reproducing step becomes a predetermined target value.

11. The image processing method according to claim 7, wherein the output device reproduces the image on a piece of paper.

12. The image processing method according to claim 11, wherein the controlling step includes the steps of:
  reproducing a predetermined test pattern on a piece of paper in the output device; and calibrating the color reproduction range of the output device so that the image data obtained when an image reader reads the test pattern reproduced in the reproducing step become a predetermined target value.

13. An image processing apparatus comprising:

a γ correction portion for performing γ correction of received image data:

an output device for reproducing the image data corrected by the γ correction portion;

a converter for converting the received image data into image data of a standard color space;

a decision portion for deciding whether the image data converted by the converter are within a reference range of color reproduction in the output device, an actual color reproduction range in the output device decreasing from the reference range of color reproduction over time of operation of said output device; and a controller for calibrating the characteristics of the γ correction portion so as to increase the color reproduction range of the output device close to the reference range when the decision portion has decided that the image data are out of the reference range, wherein the color reproduction range of the output device is compared to the reference range to perform calibration on the output device, the γ correction portion corrects the image data by the calibrated characteristics, and the output device reproduces the corrected image data.

14. The image processing system according to claim 13, further comprising a display for displaying a message asking whether the calibration is necessary or not when the decision portion has decided that the image data are out of the reference range, wherein the controller controls the output device to perform the calibration in accordance with a specific instruction operation responding to the message displayed on the display.

15. The image processing system according to claim 13, wherein in the calibration the output device reproduces a predetermined test pattern, and the controller calibrates the characteristics of the γ correction portion so that the reproduced test pattern becomes a predetermined target value.

16. The image processing system according to claim 13, wherein the output device reproduces the image on a piece of paper.

17. The image processing system according to claim 16, further including an image reader, wherein the calibration the output device reproduces a predetermined test pattern on a piece of paper, and the controller calibrates the characteristics of the γ correction portion so that the image data obtained when an image reader reads the test pattern become a predetermined target value.

* * * * *